(12) United States Patent
Son et al.

(10) Patent No.: US 6,236,476 B1
(45) Date of Patent: May 22, 2001

(54) APPARATUS FOR MAKING A HIGH QUALITY REFLECTION TYPE HOLOGRAPHIC OPTICAL ELEMENT

(75) Inventors: Jung Young Son, Seoul (KR); Vadim V. Smirnov, St.Petersburg (RU); Hyung Wook Jeon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/058,134

(22) Filed: Apr. 10, 1998

(30) Foreign Application Priority Data

Apr. 11, 1997 (KR) .................................. 97-13487

(51) Int. Cl.[7] .............. G03H 1/04; G03H 1/00; G03H 1/10
(52) U.S. Cl. ................... 359/35; 359/1; 359/30; 359/10; 359/3; 430/1; 430/2
(58) Field of Search ................. 359/1, 3, 7, 10, 359/11, 12, 27, 30, 35; 430/1, 2

(56) References Cited

U.S. PATENT DOCUMENTS 4,953,923 * 9/1990 Wreede ...................... 359/3
5,330,264 * 7/1994 Ando et al. .................. 359/12

* cited by examiner

*Primary Examiner*—Audrey Chang
(74) *Attorney, Agent, or Firm*—Oblon, Spivak, McClelland, Maier & Neustadt, P.C.

(57) ABSTRACT

An apparatus for making a high quality reflection type holographic optical element (HOE) using a single input laser beam, including a reflective mirror, a holographic photoplate having a photo emulsion layer on a surface nearest the reflective mirror, a cassette for retaining the reflective mirror and the holographic photoplate, and a refractive index matching fluid containing a light absorbent dye for absorbing an input laser beam. The cassette is immersed in the fluid so that fluid is retained between the photo emulsion layer of the holographic photoplate and a reflective surface of the reflective mirror. Parasitic interference patterns are suppressed by heating the refractive index matching fluid with the input laser beam, which causes a shift of the phase of the parasitic beams with respect to the phase of the beams responsible for recording the HOE. If the photo emulsion layer of the holographic photoplate consists of a dichromated gelatin (DCG), then a photo sensitizer agent (e.g., ammonium dichromate; DCA) of the DCG is used as a light absorbent dye to be added in the refractive index matching fluid such that the photo sensitizer agent does not drain out of the DCG into the refractive index matching fluid.

4 Claims, 4 Drawing Sheets

APPARATUS FOR MAKING A HIGH QUALITY REFLECTION TYPE HOLOGRAPHIC OPTICAL ELEMENT

BACKGROUND OF THE INVENTION

1. Field of the Invention

The present invention relates to holography and, more particularly, to an apparatus for making a reflection type Holographic Optical Element (HOE).

2. Description of the Related Art

An HOE is a hologram that functions as an optical element, such as a lens, a diffuser, a filter, or a mirror or a hilogram that performs a combination of these functions. The HOE has an advantage in that an optical system can be a small or simple structure. However, the HOE is so difficult to manufacture that it is used only for special purpose optical display elements such as a filter for spectral application, a Head Up Display (HUD), and a Helmet Mounted Display (HMD).

In manufacturing a reflection type HOE, interference patterns are generated that include a main interference pattern and a spurious or parasitic interference pattern. The main interference pattern is generated as an input beam, reflected by a mirror or an object, interferes with another input beam directly transferred from a laser. The spurious or parasitic interference pattern has been found to be generated as a beam, which was reflected from an object and secondly by the surface of a holographic photoplate making contact with an air, which interferes with another input beam or the beam that reflected from a mirror. One of the problems associated with manufacturing a reflection type HOE is that this interference pattern degrades the HOE by increasing the bandwidth and decreasing the diffraction efficiency such that additional flares appear around the reconstructed image. When the HOE is applied particularly to an display device such as a HUD and HMD for an aircraft, the quality degradation of the HOE requires that the output beam of the projector should be strong enough to generate a bright image. In this case, more power is consumed and overall device weight is increased, thereby decreasing the efficiency of the device. However, an aircraft should be small and efficient, since the power supply and weight are limited. Further, a filter used for a spectrum analysis should pass only light of specific wavelengths and reflect light of the other wavelengths, which requires that the diffraction efficiency should be 100 percent to reflect light of such wavelength.

Conventional approaches in attempting to make a high quality reflection type HOE will be explained. The first approach photographs a hologram after positioning a master glass block that has the same refractive index as a substrate glass of a photoplate, and a thickness larger than the coherent length of a laser over a photoplate (as disclosed in SPIE 1993, Vol. 1988, p. 143). The second approach records through a cover glass plate connected to several piezo elements over a photoplate (as disclosed in U.S. Pat. No. 4,458,977 issued on Jul. 10, 1984). The third approach compensates the influence of a plate reflective beam by using two beams (as disclosed in U.S. Pat. No. 4,458,978 issued on Jul. 10, 1984). The first and second approaches prevent interference by dephasing the beam reflected from a plate. If a master glass block is used, the type of master glass should be made to correspond to the type of HOE, and aberrations such as an astigmatism is generated as the thickness is increased, degrading the quality of a HOE. Also, the manufacturable size of a HOE is limited, since the glass block becomes difficult to manipulate as the size of a glass block is increased according to the size of a HOE. If piezo elements are alternatively used, since a cover glass corresponding to the type of photoplate is vibrated by the piezo elements over the photoplate, the vibrating piezo elements could vary the gap between a photoplate and an object mirror via a refractive index matching fluid. Further, as the size of the cover glass increases, the vibration by the vibrating piezo element becomes more difficult to generate, thus the manufacturable size of the HOE is limited. The approach of using two beams is difficult to implement, since two beams must be controlled by matching independently.

SUMMARY OF THE INVENTION

An object of the present invention is to provide an apparatus for making a reflection type HOE by using a single laser beam, in which the above mentioned prior art problem of spurious or parasitic interference pattern is prevented by stirring up the molecules in a refractive index matching fluid and not by using a master glass or a piezo element.

The stirring of molecules is performed by immersing the photoplate for making a HOE and a mirror used as an object into a refractive index matching fluid bath and then heating the refractive index matching fluid with an input laser beam.

In accordance with the present invention, an apparatus for making a high quality reflection type HOE comprises a reflective mirror, a holographic photoplate having a photo emulsion layer at one surface thereof which faces the reflective mirror, a cassette for retaining the reflective mirror and the holographic photoplate, and a bath encompassing the cassette. A refractive index matching fluid containing a light absorbent dye for absorbing an input laser beam is retained between the cassette and the bath and between the photo emulsion layer of the holographic photoplate and a reflective surface of the reflective mirror.

According to the invention, a high quality HOE of specific size and type may be manufactured easily, since the manufacturing is performed without using any other means for dephasing the reflected wave except a refractive index matching fluid bath.

BRIEF DESCRIPTION OF THE DRAWINGS

The aforementioned aspects and other features of the invention are explained in the following description, taken in connection with the accompanying drawing wherein.

DETAILED DESCRIPTION OF THE INVENTION

Figure 1:
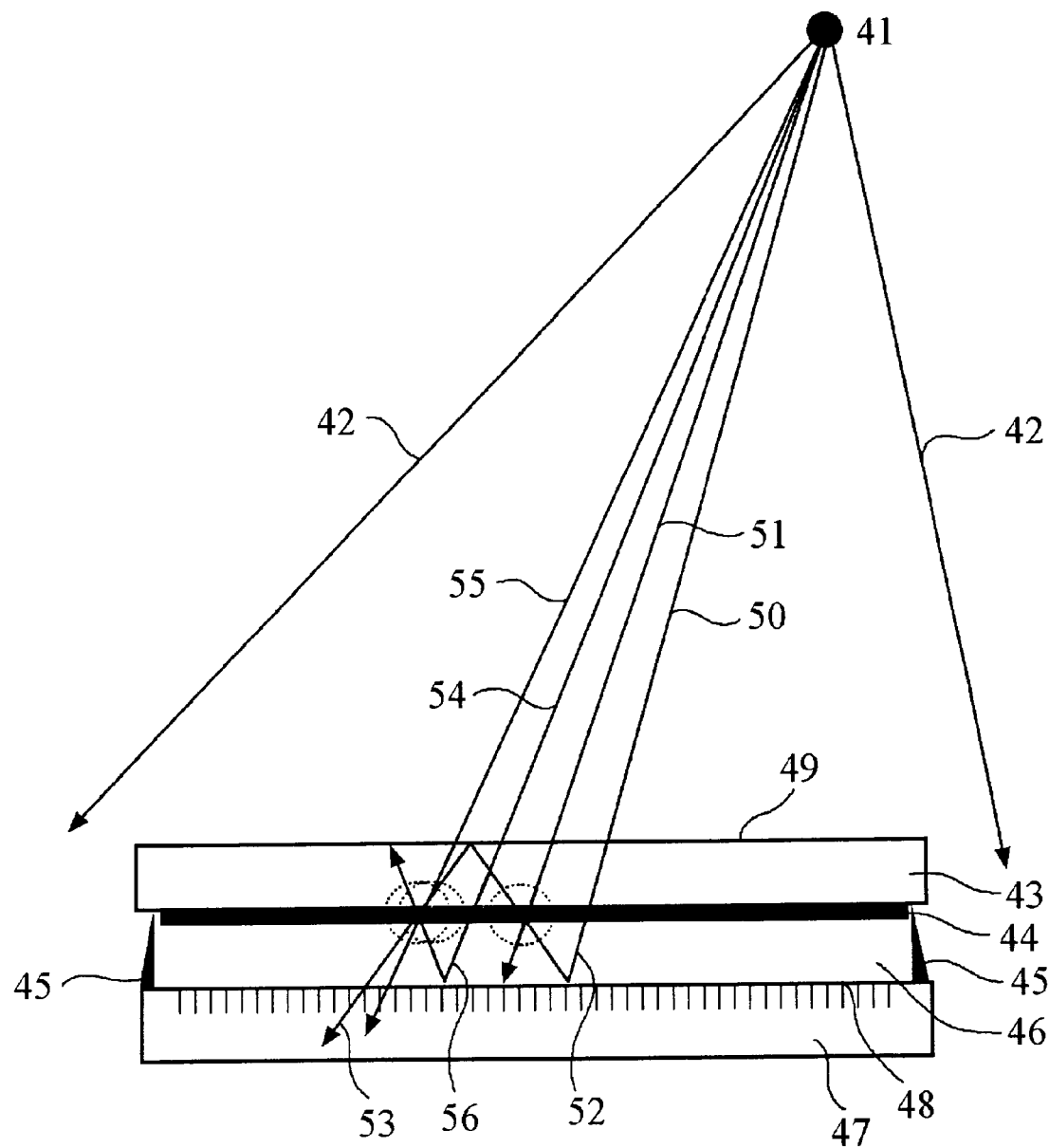
FIG. 1 illustrates the development of interference patterns by input beams and reflected beams.

Referring to FIG. 1, which shows a sectional view of a holographic photoplate, formation of interference patterns will be explained. The interference patterns are generated by an input beam, a reflection beam reflected from an object, and a reflection beam reflected back from a photoplate. An input beam 42 from a point laser source 41 goes through a glass plate 43 of a holographic photoplate, an emulsion layer 44 making contact with the glass plate 43, and a refractive index matching fluid 46. The beam is reflected from a reflective surface 48 of a reflective mirror 47, which is used as an object, so that the input beam 42 goes out through a reflected path through the reflective index matching fluid 46, emulsion layer 44, and glass plate 43 which is different from the input path. The mirror 47 and the glass plate 43 of the photoplate are separated by supporting blocks 45 which has a height of 0.5 mm or less, and a refractive index matching fluid 46 is retained between the photo emulsion layer 44 and the mirror surface 48 such that input and reflected beams travel straight without refraction. The photo emulsion layer 44 generally extends to a position which is apart by 2 mm from the edge of the glass surface inwardly, and the supporting block 45 reaches inward about 1 mm from the edge of the glass. Thus, the supporting block 45 is separated from the photo emulsion layer 44.

The interference patterns in the photo emulsion layer 44 are generated for various reasons. Input beams 50 and 54 are reflected from the mirror surface 48, then the reflected beams 52 and 56 interfere with other input beams 51 and 55 forming main interference patterns. The reflected beam 52 is further reflected back from an air to glass interface 49 of the glass plate 43, then the reflected beam 53 interferes with other input beam 55 in the photo emulsion layer 44 forming a parasitic interference pattern which has texture-like hologram shape of low frequency transmission type. The further reflected beam 53, which was reflected from the glass plate, also interferes with other reflected beam 56 forming a spurious reflection type interference pattern. The spurious and parasitic interference patterns are both formed by an interference of further reflected beams which were reflected from an air to glass interface of the glass plate. In order to prevent the spurious and parasitic interference patterns, further-reflected beams which generate these interference patterns should not be generated. However, generation of the further-reflected beams is hard to be avoided, since the reflected beams would not be further-reflected only when an incidence angle of an input beam is large. Alternatively, coherent characteristics of the reflected beams may be eliminated by dephasing the the further-reflected beams in order to prevent those interference patterns. Thus, it is desirable to eliminate the coherent characteristics of the further reflected beams.

Figure 2A:
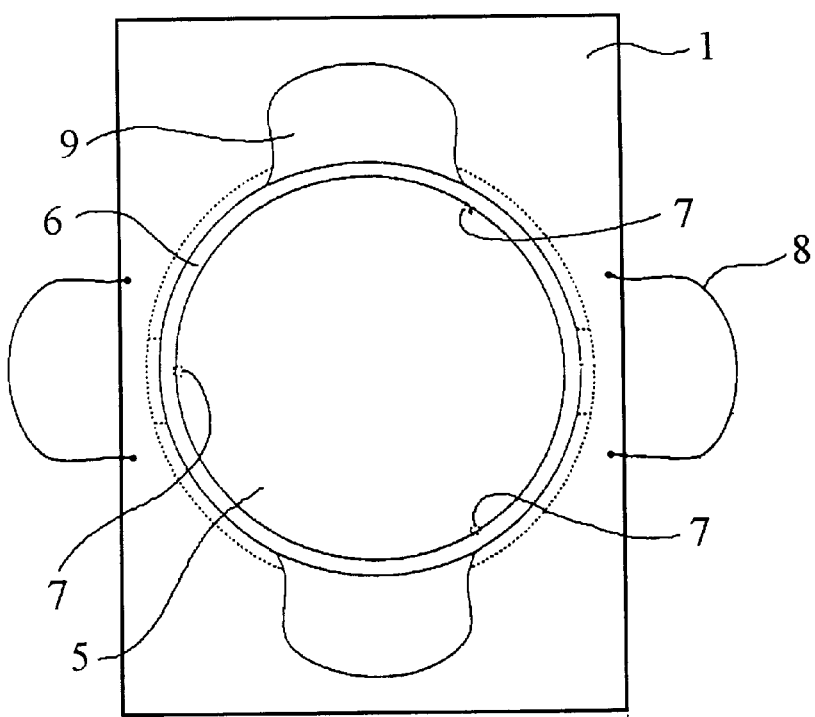
FIGS. 2a and 2b are plain and sectional views, respectively of an optical apparatus in accordance with the present invention.
Figure 2B:
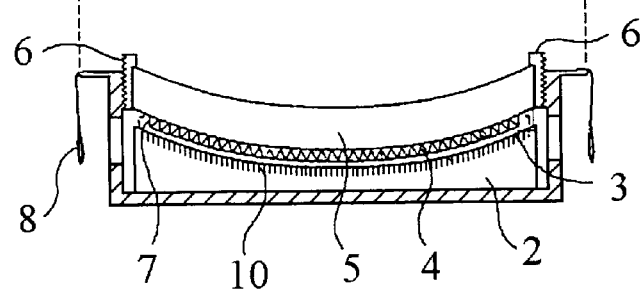

FIGS. 2a and 2b are plan and cross-sectional views, respectively, of an optical apparatus having a cassette for making a HOE of spherical shape. A holographic photoplate 5, which has substantially the same radius of curvature as the HOE to be manufactured, is mounted to three identical supporting blocks 7. The supporting blocks 7 are positioned with 120° spacing on the edges of reflective surface 10 of spherical mirror 2, wherein the spherical mirror 2 is concentric with the holographic photoplate 5. Then, the overall structure is fixed in position within the cassette 1 by clamps 6. A refractive index matching fluid is retained in a space defined by the mirror surface 10 of the spherical mirror 2 and the photo emulsion layer 4 of the holographic photoplate 5. Since the cassette 1 is provided with handles 8 and recesses 9, it is easy to transport the cassette 1 and to remove the photoplate 5 and mirror 2 from the cassette 1.

Figure 3:
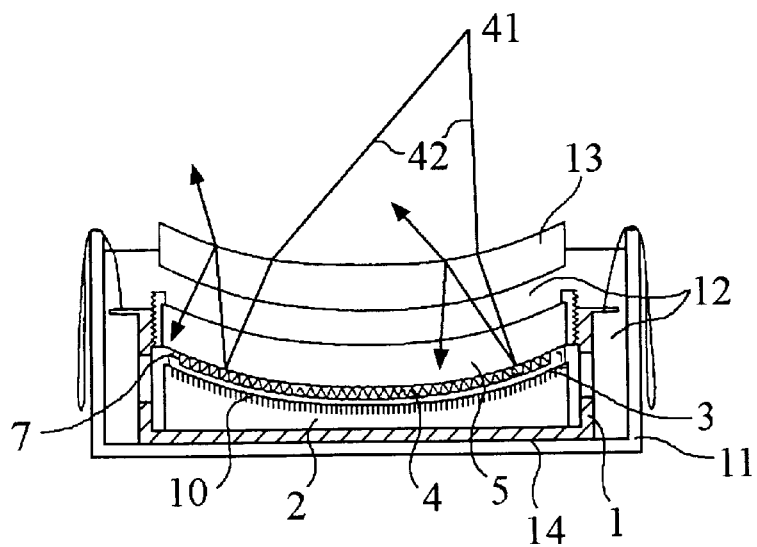
FIG. 3 is a refractive index matching fluid bath in accordance with the present invention.

FIG. 3 shows the overall structure of an apparatus for making a HOE in accordance with the present invention. The cassette 1 of FIG. 1 is fixed in a bath 11 which is larger than the cassette. The bath is filled with a refractive index matching fluid 12, wherein the refractive index matching fluid 12 is filled up to a upper plane of the cassette 1. Then, an optical glass 13 is made to float on the surface of the refractive index matching fluid 12, wherein the optical glass 13 is larger than the holographic photoplate 5 and curved in a concentric manner with the holographic photoplate 5. The refractive index of the optical glass 13 is the same as that of the holographic photoplate 5. The position of the optical glass 13, which functions as a window through which the input beam passes, with respect to the cassette 1, is varied in response to the incidence angle of the input beam so as to make the overall input beam to be received through the optical glass. The refractive index matching fluid 12 may be introduced between the photo emulsion layer 4 of the holographic photoplate and the reflective surface 10 by capillary action in order to avoid the simultaneous introduction of air bubbles. The input laser beam emanating from point source 41 with edge rays 42 illuminates the input glass window 13 of the cassette 1. The position and orientation of the point source 41 relative to the glass 13 are defined by the HOE recording setup. The position of the glass 13 also depends on the incidence angle of the input beam to make overall input beam to be received through the optical glass 13 illuminate the photolayer 4 of photoplate 5. The refractive index matching fluid 12 includes a; suitable quantity of light absorbent dye in order. If a dichromated gelatin (DCG) is used as a holographic photoplate, it is desirable to use the sensitizer of DCG as a dye to be mixed with the refractive index matching fluid. In this way, the outflow of the sensitizer (e.g. ammonium dichromate; DCA) from the DCG and absorption of the sensitizer to the DCG from the index matching fluid may be in equilibrium, such that the sensitivity of the DCG remains at a specific level.

It is appreciated that the refractive index may be varied as the refractive index matching fluid is heated by an input laser beam. Further, in response to the variation of the index, the optical path difference of a beam that reflected back from an air to glass interface of an optical glass 13 is varied. The desired variation of the index is a value which is required to provide at least one wavelength of an input beam to the optical path difference of the beam that is reflected back from the air to glass interface during exposure of the HOE. Accordingly, the difference between the heights of the holographic photoplate and optical glass 13 is determined by the above mentioned criteria. Thus, spurious and parasitic interference patterns, which are generated as a beam that was reflected back from the air to glass 13 interface interferes with the other input beam, may be prevented.

However, in order to maintain the contrast of an interference pattern, which is generated as a beam that reflected from a mirror surface 10 interferes with an input beam from a laser, to a maximum value, an index matching fluid should be retained between a mirror 2 and a photo emulsion layer 4 as small as possible. The index variation of a refractive index matching fluid at a space between the mirror 2 and the photo emulsion layer 4 is determined such that the optical path difference of the beam reflected from the mirror surface 10 is to be at or below about one tenth of the input beam wavelength for all exposure time.

Figure 4A:
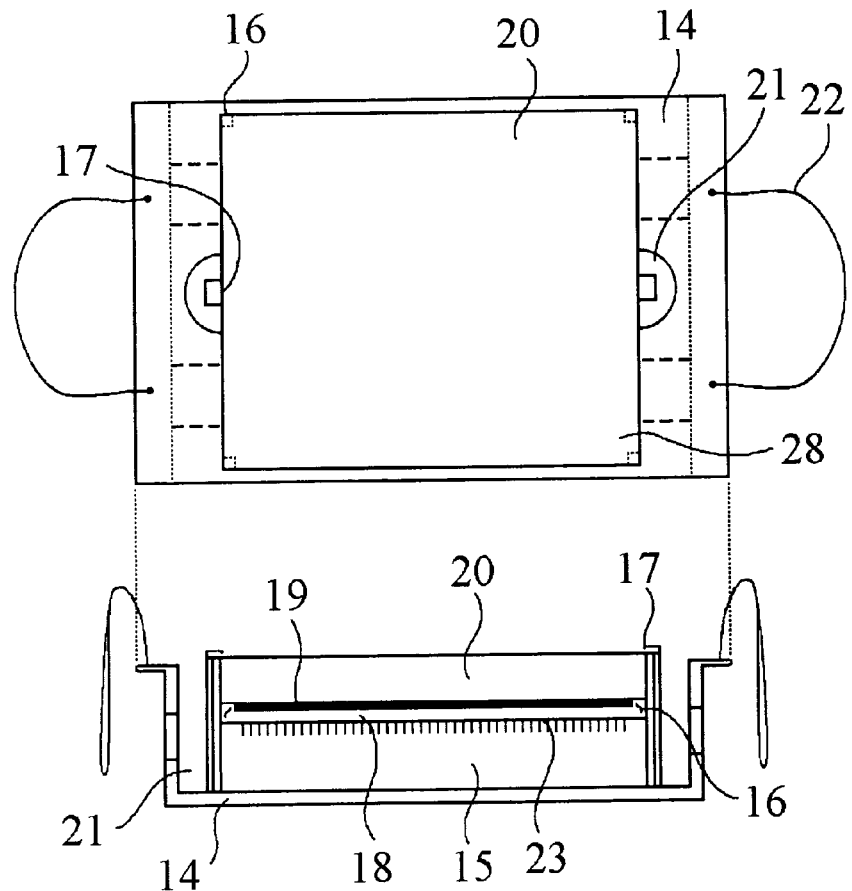
FIGS. 4a and 4b illustrate an apparatus for making a planar HOE in accordance with the present invention.
Figure 4B:
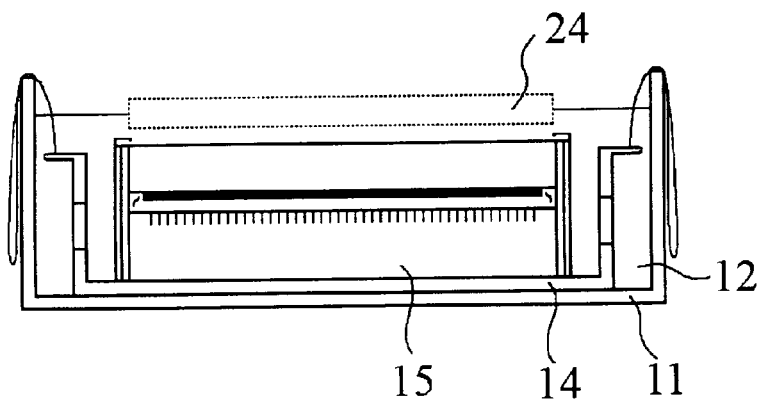

FIGS. 4a and 4b show an optical apparatus for making a planar HOE in accordance with the present invention. A plane mirror 15 is positioned within a cassette 14 with the reflective surface 23 facing sky. Four supporting blocks 16, which have the same size and shape as the supporting blocks shown in FIG. 2, are arranged at 4 edges of the planar mirror 15. Then, a holographic photoplate 20 is mounted on the supporting blocks with a photo emulsion layer 19 facing the reflective surface 23 of the plane mirror 15 and clamps 17 may retain the holographic photoplate 20 in position. The empty space 18 between the photo emulsion layer 19 and reflective surface 23 is filled with a refractive index matching fluid. The cassette 14 is provided with handles 22 and recesses 21 such that the transportation becomes easy and the mirror 15 and photoplate may be easily installed to and extracted from the cassette. The cassette 14 is fixed in a bath 11 as shown in FIG. 4b. The bath 11 is filled with a refractive index matching fluid 12 in which a suitable quantity of dye, e.g., a photo sensitizer agent for a DCG, is inserted. The glass plate 24, which is a little larger than the holographic photoplate and has the same refractive index as the holographic photoplate, may be made to float over the refractive index fluid if the exposure condition is bad, i.e., any vibration is found and/or the refractive index matching fluid is not in an complete equilibrium. If the exposure condition is fine, the glass plate 24 is unnecessary. The glass plate 24 functions as an window. Then, the structure is exposed to a light after a predetermined time. After the exposure, the holographic photoplate is extracted from the cassette and the clamps are released. The photoplate is extracted and soaked in 100% isopropyl alcohol for a few minutes to remove the index matching fluid. The photoplate is then developed, wherein the developing method may follow any general developing techniques according to the types of photo emulsion layers.

Figure 5:
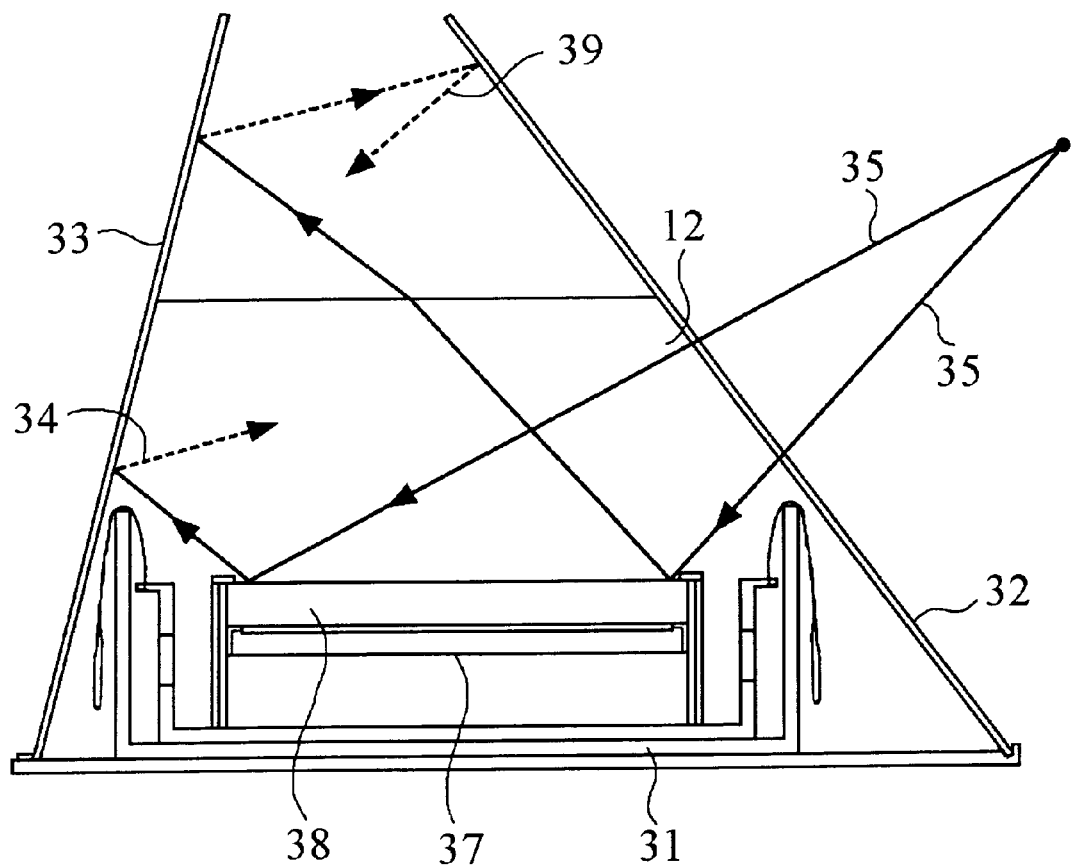
FIG. 5 illustrates an apparatus for making a HOE for use in infrared lights in accordance with the present invention.

FIG. 5 shows an optical apparatus for making a HOE when the incidence angle of an input beam is large, i.e., for recording the HOE of infrared light systems. A cassette 31 is fixed within a bath, wherein one wall of the bath is made of a light obsorbent neutral density glass 33. An exposed laser beam 35 incoming through a window glass 32 is reflected from a reflective surface 37 of a mirror in the cassette 31 and passes through a holographic photoplate 38, then the neutral density glass 33 absorbs the laser beam 35 applied to a neutral density glass 33. Thus, no beam 34 is reflected from the neutral density glass. Also, reflection of the laser beam from the window glass may be minimized, since the window glass 32 is tilted.

According to the invention, a high quality HOE having any size and shape may be easily manufactured, since no other means for dephasing the parasitically reflected beam is required.

Therefore, the appended claims are intended to cover any and all such applications, modifications, and embodiments that fall within the scope of the present invention.

What is claimed is:

1. An apparatus for making a reflection type holographic optical element (HOE) by using a single input laser beam, the apparatus comprising:

a reflective mirror having a reflective surface;

a holographic photoplate positioned adjacent said reflective mirror, said photoplate having a photo-emulsion layer on a surface nearest said reflective mirror, said photoplate having a refractive index;

a cassette for retaining said reflective mirror and said holographic photoplate; and a refractive index matching fluid that includes a light absorbent dye for partially absorbing said laser input beam and thereby heating said fluid, said fluid having a reflective index equal to the refractive index of said holographic photoplate, said cassette being immersed in said fluid, wherein said fluid is retained between the photo-emulsion layer of said holographic photoplate and the reflective surface of said reflective mirror.

2. The apparatus of claim 1 further comprising an optical glass plate retained in said cassette and positioned adjacent a surface of said holographic photoplate furthest from said reflective mirror, wherein said refractive index matching fluid is retained between said holographic photoplate and said optical glass plate, said optical glass plate having a refractive index equal to the refractive index of said holographic photoplate.

3. The apparatus of claim 2 further comprising a plurality of supporting blocks positioned at edges of said reflective mirror for maintaining a uniform gap between the reflective surface of said reflective mirror and the photo-emulsion layer of said holographic photoplate across all of the reflective surface, wherein the number of said supporting blocks is the minimum value required to solidly mount said holographic photoplate adjacent the flective surface of said reflective mirror.

4. The apparatus of claim 2 wherein the position of said optical glass plate varies with respect to the position of said input laser beam.

* * * * *

UNITED STATES PATENT AND TRADEMARK OFFICE
CERTIFICATE OF CORRECTION

PATENT NO.    : 6,236,476 B1
DATED         : *May 22, 2001
INVENTOR(S)   : Son et al.

It is certified that error appears in the above-identified patent and that said Letters Patent is hereby corrected as shown below:

<u>Title page,</u>
The CPA information has been omitted. It should read as follows:

-- [45] Date of Patent:   *May 22, 2001 --

-- (*) Notice:   This patent issued on a continued prosecution application filed under 37 CFR 1.53(d), and is subject to the twenty year patent term provisions of 35 U.S.C. 154(a)(2). --

Signed and Sealed this

Nineteenth Day of February, 2002

Attest:

JAMES E. ROGAN
Attesting Officer
Director of the United States Patent and Trademark Office